United States Patent [19]

Murata

[11] 4,159,701
[45] Jul. 3, 1979

[54] SYSTEM FOR CONTROLLING FUEL SUPPLY IN INTERNAL COMBUSTION ENGINE

[75] Inventor: Chigaku Murata, Toyota, Japan

[73] Assignee: Toyota Jidosha Kogyo Kabushiki Kaisha, Aichi, Japan

[21] Appl. No.: 773,931

[22] Filed: Mar. 3, 1977

[30] Foreign Application Priority Data

Aug. 26, 1976 [JP] Japan .......................... 51/113498[U]

[51] Int. Cl.² ...................... F02D 31/00; F02D 11/08
[52] U.S. Cl. .............................. 123/97 B; 123/103 R; 123/198 DB; 123/DIG. 11
[58] Field of Search ... 123/198 DB, 198 D, DIG. 11, 123/97 B, 103 R

[56] References Cited

U.S. PATENT DOCUMENTS

| | | | |
|---|---|---|---|
| 3,517,653 | 6/1970 | Ariga et al. .................. | 123/DIG. 11 |
| 3,795,237 | 3/1974 | Denton .................... | 123/DIG. 11 X |
| 3,841,281 | 10/1974 | Mick ........................ | 123/DIG. 11 X |
| 3,933,952 | 1/1976 | Elmore .................... | 123/DIG. 11 X |
| 3,977,384 | 8/1976 | Jahn ............................. | 123/198 DB |
| 4,058,978 | 11/1977 | Bockelmann et al. ...... | 123/198 D X |
| 4,059,081 | 11/1977 | Kayanuma ........................ | 123/97 B |

Primary Examiner—Ira S. Lazarus
Attorney, Agent, or Firm—Stevens, Davis, Miller & Mosher

[57] ABSTRACT

A system for controlling or interrupting the fuel supply in an internal combustion engine operating under a braking condition, in response to the vacuum level in its intake system. This system is equipped with an air pump driven by an output shaft of the engine, and a pressure responsive valve including two chambers partitioned by a diaphragm, a valve body coupled to the diaphragm and a valve seat therefor. A discharge pressure from the air pump is applied to one of the chambers, and a vacuum from the intake system, downstream of a throttle valve in the carburetor, is applied to the other of the chambers. This pressure responsive valve readily discriminates between the engine braking condition and the idling condition of the engine, by widening the sensible or detecting range between the maximum possible vacuum level in an intake pipe, upon idling and the minimum possible vacuum level in the intake pipe, upon engine braking. When the system detects engine braking condition, the fuel supply is interrupted so as to suppress the generation of harmful constituents in the exhaust gases.

12 Claims, 5 Drawing Figures

SYSTEM FOR CONTROLLING FUEL SUPPLY IN INTERNAL COMBUSTION ENGINE

BACKGROUND OF THE INVENTION

1. Field of the Invention

This invention relates to a system for controlling or interrupting the fuel supply in an internal combustion engine, and more particularly to a system including a pressure responsive valve which readily discriminates between an engine braking condition and an idling condition.

2. Description of the Prior Art

Hitherto, there have been proposed many attempts for interrupting fuel supply to an intake system so as to suppress generation of harmful constituents in the exhaust gases, when an internal combustion engine remains in an engine braking condition. One of these attempts is disclosed in Published Japanese Patent Application Sho No. 50-150,531. More particularly, in these attempts, a vacuum in an intake pipe downstream of a throttle valve is connected to a diaphragm chamber in a valve, so that when a vacuum thus introduced is at a level higher than a predetermined level, the fuel supply is interrupted, assuming that the engine is in an engine braking condition. The above predetermined vacuum level is set to a mean value between the maximum possible vacuum level in the intake pipe upon idling and the minimum possible vacuum level in the intake pipe, upon engine braking, i.e., a midpoint between the two vacuum levels. For instance, a vacuum level in an intake pipe in an automobile running at the sea level is 620 mmHg upon engine braking, and 500 mmHg upon idling, while a vacuum level in an intake pipe in an automobile running about 1000 meters above the sea level is 540 mmHg, upon engine braking and 450 mmHg upon idling. Thus, the aforesaid given level, at which a diaphragm is deflected, is set to a mean value between 500 mmHg and 540 mmHg, i.e., to 520 mmHg. In this case, a range or allowance to be sensed remains only ±20 mmHg. Accordingly, taking into consideration the possibility of that automobile running at a level higher than 1000 meters above the sea level, and manufacturing errors of diaphragms, the above allowance of ±20 mmHg is insufficient.

SUMMARY OF THE INVENTION

It is accordingly an object of the present invention to provide a system for controlling or interrupting the fuel supply in an internal combustion engine, which may readily discriminate bewteen the idling condition and the engine braking condition of the engine.

It is another object of the present invention to provide a system for controlling or interrupting the fuel supply, which system includes a pressure responsive valve having a sensible range wide enough to discriminate between idling and engine braking conditions.

Accordingly, the present invention includes: an air pump driven by an output shaft of the engine, and a pressure responsive valve consisting of two chambers separated by a diaphragm, a valve body coupled to the diaphragm, and a valve seat cooperating with the valve body for opening or closing the fuel or air supply passage, a discharge pressure from the air pump being supplied to one of the aforesaid two chambers and the vacuum of the intake system, downstream of a throttle valve, being connected to the other of the chambers.

DESCRIPTION OF THE PREFERRED EMBODIMENTS

Figure 1:
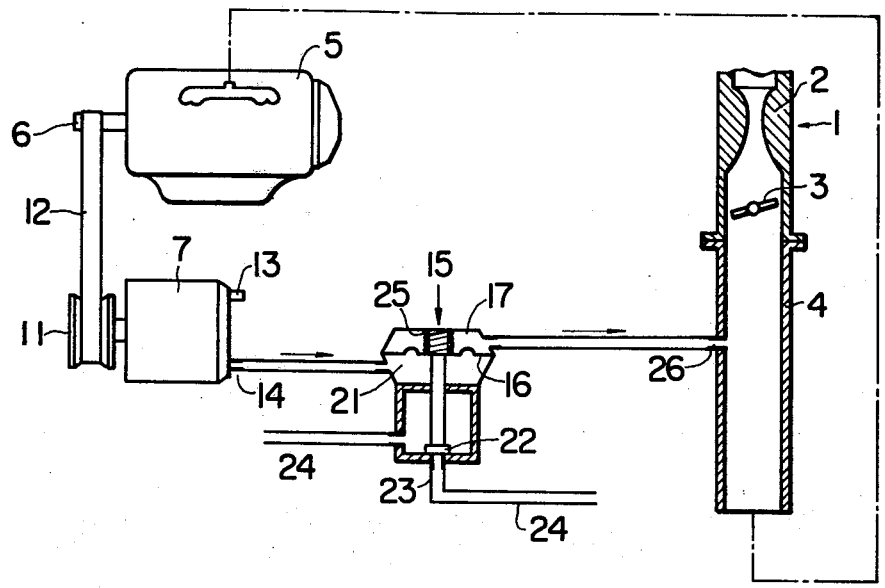
FIG. 1 is a schematic diagram of a system for controlling or interrupting the fuel supply in an internal combustion engine, according to the present invention.

Referring now to FIG. 1, shows a carburetor 1, having a venturi portion 2, a throttle valve 3, and an intake pipe 4 which is connected to an internal combustion engine 5. An output shaft 6 of the internal combustion engine is connected to a pulley 11 secured to the shaft of an air pump 7 by means of an endless belt 12. The air pump 7 supplies secondary air to an exhaust system for oxidizing harmful emissions therefrom. The air pump 7 compresses air introduced through an inlet 13 from the atmosphere and discharges same through an outlet 14. The level of the discharge pressure from the pump is substantially proportional to the rotational speed of the output shaft 6 of the engine 5, the shaft being connected as previously mentioned to the air pump 7 by means of the belt 12 and pulley 11. A pressure responsive valve 15 includes two chambers 17, 21 separated by a diaphragm 16, a valve body 22 coupled to the diaphragm 16, and a valve seat 23 cooperative therewith. When the diaphragm is maintained in its neutral position by means of a spring 25, the valve body 22 closes a fuel supply passage 24 in cooperation with the valve seat 23. An intake port 26 is provided in the intake pipe 4 for introducing the vaccum from the intake system down-stream of throttle valve 3. The upper chamber 17 in the pressure responsive valve 15 is connected to the intake port 26, while the lower chamber 21 is connected to the outlet 14 of the air pump 7.

When an automobile runs on a road at sea level, the atmospheric pressure is quite high, so that the vacuum in the intake pipe is increased, as compared with the vacuum in the intake pipe 4 when an automobile runs high above sea level.

Both upon engine braking and upon idling, the throttle valve 3 is maintained almost in its fully closed position. Since the rotational speed of the engine 5 upon engine braking is greater than that upon idling, the vacuum in the intake pipe 4 upon engine braking is higher than that upon idling.

The rotational speed of the output shaft 6 of engine 5 when braking is greater than the speed upon idling, with the result that the discharge pressure from the air pump 7 is higher than the speed upon idling. The discharge pressure from the air pump 7 at sea level is slightly higher than that at a high elevation because of the difference in atmospheric pressure.

The following table shows numerical values of vacuum a in the intake pipe 4 and pressure b supplied through the outlet 14 of the air pump 7. Character A given in this table refers to an idling condition at sea level, B an idling condition about 1000 meters above sea level, C an engine braking condition at sea level, and D an engine braking condition about 1000 meters above sea level. The numerical values are given in mmHg.

|   | a   | b   | a + b |
|---|-----|-----|-------|
| A | 500 | 10  | 510   |
| B | 450 | 10  | 460   |
| C | 620 | 200 | 820   |
| D | 540 | 160 | 700   |

Referring to the pressure responsive valve 15 shown in FIG. 1, a vacuum introduced through the intake port 26 from the intake pipe 4 into the upper chamber 17 together with a pressure supplied through the outlet 14 from the air pump 7 into the lower chamber 21 serve as upward forces acting on the diaphragm 16.

Figure 2:
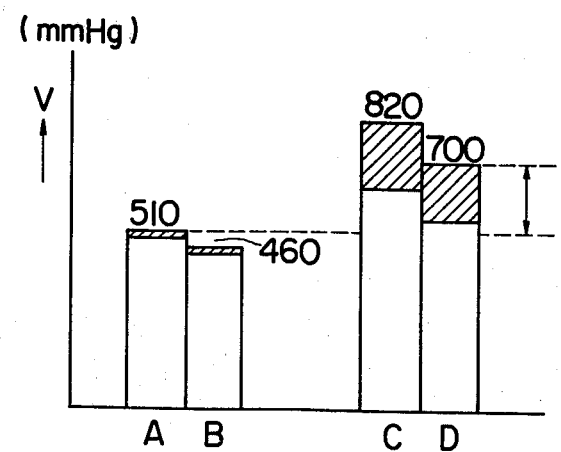
FIG. 2 is a graph showing vacuum applied to a diaphragm in a pressure responsive valve.

FIG. 2 shows forces or absolute pressure V (in mmHg) acting upwardly on the diaphragm 16 in conditions A to D. Portions free of hatching in FIG. 2 represent vacuums a, while the hatched portions represent discharge pressures from the air pump 7.

As is best seen from FIG. 2, the maximum total pressure V acting on the diaphragm upon idling is 510 mmHg, while the minimum total pressure upon engine braking is 700 mmHg. Accordingly, an absolute pressure, at which the diaphragm 16 in the pressure valve 15 is deflected upwards against the force of the spring 17 is set to 605 mmHg, which is the mean value between 510 mmHg and 700 mmHg. This mean value provides an allowance of ±95 mmHg. Thus, either at sea level or at a level higher than sea level, the aforesaid valve may positively discriminate between an idling condition and an engine braking condition, for opening and closing passage 24.

The description will now be directed to the applications of the system according to the present invention.

Figure 3:
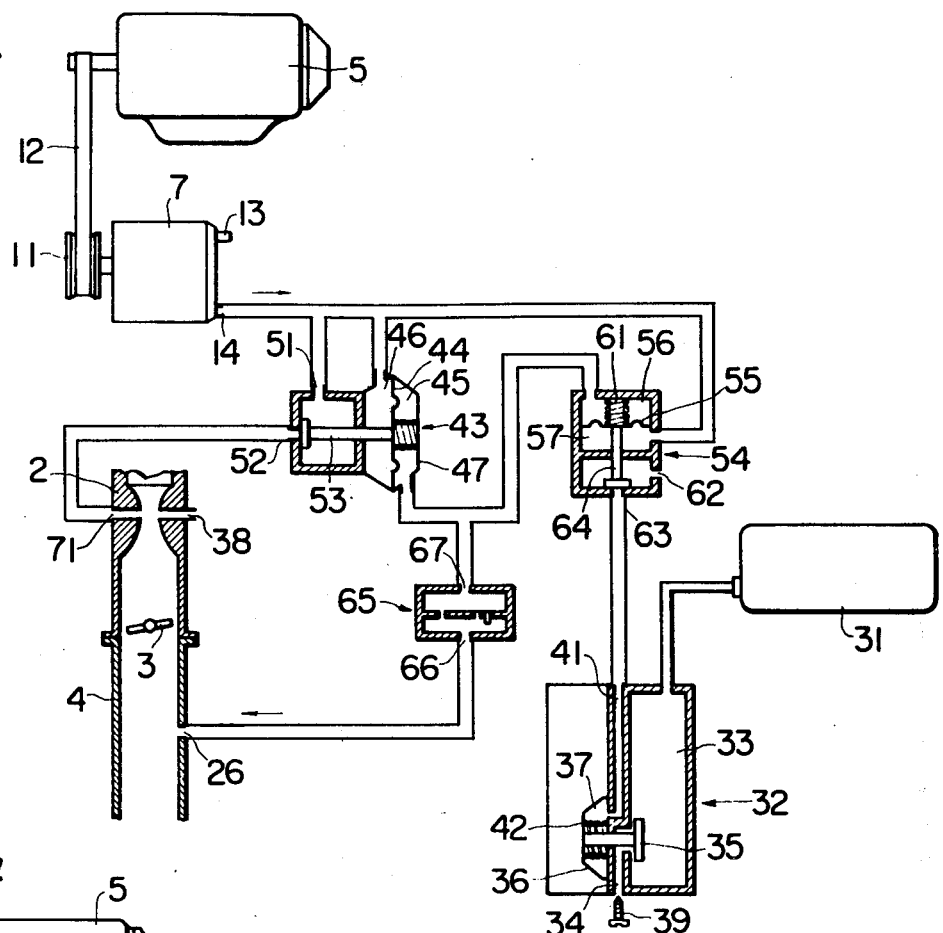
FIG. 3 is a schematic diagram of a system for controlling or interrupting the fuel supply for use in a LPG internal combustion engine, according to the present invention.

FIG. 3 shows a fuel-supply-interrupting system providing for an engine braking condition, for use in a LPG internal combustion engine. Like parts are designated with like reference numerals for common use with FIG. 1. A liquefied fuel in a fuel reservoir 31 is introduced into a primary chamber 33 in a vaporizer 32. The vaporizer 32 vaporizes fuel under a reduced pressure. The fuel thus vaporized for a main fuel system is introduced from the primary chamber 33 into a secondary chamber not shown and then through a main port 38 into a venturi portion 2 in carburetor 1 by suction due to the vacuum in the venturi portion 2. On the other hand, fuel in a slow system is supplied from the primary chamber 33 by way of a slow passage 34 into an intake system. Shown at 39 is a screw for adjusting a cross-sectional area of the slow passage 34. A slow lock valve body 35 controls the communication between the primary chamber 33 and the slow passage 34 and is coupled to a slow lock diaphragm 36. A slow lock diaphragm chamber 37 is defined by the slow lock diaphragm 36, and is supplied a vacuum by way of a passage 41 from the intake pipe 4, or an atmospheric pressure through a port 62 to be described hereinafter. When the slow lock diaphragm chamber 37 is supplied atomospheric pressure, then the slow lock diaphragm 36 is maintained in its neutral position by means of a spring 42, whereby the slow lock valve body 35 shuts off the communication between the primary chamber 33 and the slow passage 34. When a vacuum is introduced into the slow lock diaphragm chamber 37, the slow lock diaphragm 36 is deflected to the right against the force of the spring 42, as viewed in FIG. 3, so that the slow lock valve 35 allows communication between the primary chamber 33 and the slow passage 34. A pressure responsive valve is shown at 43. This valve 43 is similar in function to the pressure responsive valve 15 of FIG. 1. The valve 43 includes two chambers 45,46 partitioned by a diaphragm 44, a spring adapted to maintain the diaphragm 44 in its neutral position, ports 51,52, and a valve body 53 coupled to the diaphragm 44 for controlling the communication between the port 51 and 52. Pressure responsive valve 54 is similar to the valve 15 of FIG. 1 and includes two chambers 56,57 partitioned by a diaphragm 55, a spring 61 adapted to maintain the diaphragm 55 in its neutral position, ports 62,63, and a valve body 64 coupled to the diaphragm 55 for controlling the communication between the ports 62 and 63. The port 62 is open to atmosphere. Shown at 65 is a vacuum transmitting valve which is equipped with an inlet 66 and an outlet 67. Thus, only when a vacuum is directed from the inlet 66 to the outlet 67, the introduction of a vacuum is retarded. A control port 71 provided in the venturi portion 2 controls the vacuum in the venturi portion 2.

Referring to the pressure responsive valve 43, the port 51 is connected to the outlet 14 in the air pump 7, the port 52 to the control port 71, the chamber 45 to the outlet 67 in the vacuum transmitting valve 65, and the chamber 46 to the outlet 14 in the air pump 7, respectively.

Referring to the pressure responsive valve 54, the chamber 56 is connected to the outlet 67 in the vacuum transmitting valve 65, the chamber 57 to the outlet 14 in the air pump 7, and the port 63 to a passage 41 in the vaporizer 32. The inlet 66 in the vacuum transmitting valve 65 is connected to an intake port 26 in the intake pipe 4.

In operation, when the internal combustion engine 5 remains in a condition other than engine braking, the sum in absolute pressure, of a vacuum from the intake port 26 and a discharge pressure from the air pump 7 is small. In this respect, the aforesaid vacuum from the intake port 26 deflects the diaphragms 44,45 in the pressure responsive valves 53,54 against forces of the springs 47,61. As a result, the communication between the ports 51 and 52, as well as the communication between the port 62 and 63 are shut off, so that air is not injected through the control port 71 in the venturi portion 2, nor is an atmospheric pressure supplied to the slow lock diaphragm chamber 37 through the atmosphere port 62 in the pressure responsive valve 54. In this manner, the fuel supply through the main fuel supply system and the slow fuel supply system is not interrupted, so that the main port 38 and vaporizer 32 normally operate in response to an opening of a throttle valve 3 and a vacuum in the intake pipe 4.

When the engine 5 is operated in an engine braking condition, then a vacuum at an increased level in the intake pipe 4 is introduced from the intake port 26 by way of the vacuum transmitting valve 65 to the respective chambers 45,56 in the pressure responsive valves 43,54. In addition, a discharge pressure through the outlet 14 in the air pump 7 is increased due to the relatively increased rotational speed of the engine 5, and fed to the respective chambers 46,57 in the pressure responsive valves 43,54. Thus, there results increased forces to deflect the diaphragms 44,55 against the forces of springs 47,61 in the pressure responsive valves 43,54, while the valve bodies 53,64 open the ports 52,63, respectively. In this manner, the discharge pressure from the air pump 7 is supplied through ports 51,52 in the pressure responsive valve 43, then through the control port 71 into the venturi portion 2. Because of the introduction of a discharge pressure into the venturi portion 2, fuel in the main fuel system is no longer injected through the main port 38 into the carburetor. On the other hand, atmospheric pressure is introduced by way of ports 62,63 of valve 54 and the passage 41 into the lock diaphragm chamber 37 of the vaporizer 32, so that fuel in the slow fuel supply system is no longer introduced from the primary chamber 33 into the slow passage 34. In this manner, fuel supply from the main and slow fuel supply systems into the intake system is interrupted at the time of engine braking. Meanwhile, the vacuum transmitting valve 65 serves to gradually introduce a vacuum, which is increased due to the application of engine braking, into the chambers 45,56 in the pressure responsive valves 43,54, thereby preventing unstable operation of the internal combustion engine by slowing down the interrupting operation of fuel supply.

Figure 4:
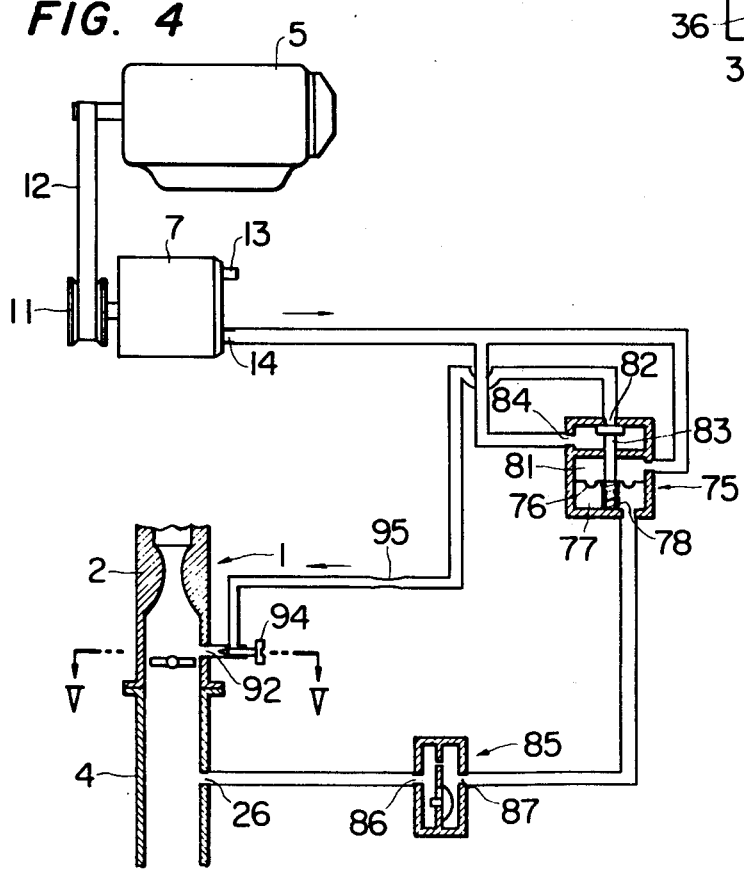
FIG. 4 is a schematic diagram of a system for controlling or interrupting the fuel supply for use in a gasoline internal combustion engine, according to the present invention.
Figure 5:
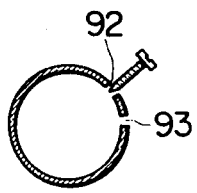
FIG. 5 is a cross-sectional view of an intake pipe, taken along the line V—V of FIG. 4.

FIG. 4 shows a fuel supply interrupting system for use in an gasoline internal combustion engine according to the present invention, which system interrupts the fuel supply upon engine braking. In this figure, as well, like parts are designated with like reference numerals as in FIG. 1. A pressure responsive valve 75 is similar in mechanism to the pressure responsive valve 43 of FIG. 3. The pressure responsive valve 75 includes two chambers 77,81 partitioned by a diaphragm 76, a spring 78 for maintaining the diaphragm 76 in its neutral position, a valve body 83 coupled to the diaphragm 76 and adapted to open and close a port 82, and a port 84 connecting with an outlet 14 in the air pump 17. When the diaphragm 76 remains in its neutral position, the port 82 is closed with the valve body 83. Vacuum transmitting valve 85 includes an inlet 86 and an outlet 87, and retards the introduction of a vacuum from the inlet 86 to the outlet 87. A control port 92 is positioned in the intake system in the vicinity of a slow port 93 (FIG. 5), through which fuel is injected from a slow system into a carburetor, and thus air being injected through the control port 92 controls the pressure prevailing in the neighborhood of the slow port 93. An adjusting screw 94 adjusts the cross-sectional area of the control port 92.

Referring to the pressure responsive valve 75, the chamber 77 therein is connected to the outlet 87 in the vacuum transmitting valve 85, the chamber 81 to the outlet 14 in the air pump 7, and the port 82 to the control port 92 by way of an orifice 95, respectively. An inlet 86 in the vacuum transmitting valve 85 is connected to the intake port 26.

When the internal combustion engine 5 is in a condition other than an engine braking condition, a vacuum being supplied from the intake port 26 to the chamber 77 in the pressure responsive valve 75 is relatively low, and a force which is created by the discharge pressure supplied from the air pump 7 to the chamber 81 and a vacuum in the intake pipe, i.e., a force to deflect the diaphragm 76 against a force of the spring 78 is relatively small. Accordingly, the valve body 83 closes the port 82, so that the discharge pressure from the air pump 7 is not injected through the control port 92, whereby the control port 92 does not affect injection of fuel through the slow port 93, and thus the port 93 maintains a normal operation in response to an opening of the throttle valve 3.

When the internal combustion engine 5 is operated in an engine braking condition, then the chamber 77 in the pressure responsive valve 75 is supplied an increased vacuum through the intake port 26 by way of the vacuum transmitting valve 85, while the chamber 81 is supplied an increased discharge pressure created due to the increased rotational speed of an engine. At this time, the diaphragm 76 of the pressure responsive valve 75 is deflected against the force of the spring 78, while the valve body 83 opens the port 82. The discharge pressure from the outlet 14 of the air pump 7 is supplied through the control port 92 by way of ports 84,82 in the valve 75 and orifice 95, thereby increasing the pressure in the neighborhood of the slow port 93, so that the fuel injection is interrupted. At the same time, air through the control port 92 increases the pressure in the neighborhood of the idle port downstream of the slow port 93, so fuel injection through the idle port is interrupted. Meanwhile, the orifice 95 adjusts the flow rate of air being fed to the control port 92.

Meanwhile, with the embodiment shown in FIG. 4, fuel supply from the main fuel supply system is not interrupted. However, if required, a control port may be provided in the venturi portion 2 for injecting air therethrough, as in the case of the LPG internal combustion engine. The vacuum transmitting valve 85 serves to smoothly interrupt the fuel supply, like the vacuum transmitting valve 65 in FIG. 3.

The foregoing information and embodiments are presented herein for illustrative purposes only and not by way of limitation of the scope of the invention.

What is claimed is:

1. A system for controlling fuel supply in an internal combustion engine, comprising:
   an air pump driven by an output shaft of said engine; and
   a pressure responsive valve including two chambers separated by a diaphragm; a valve body coupled to said diaphragm; a valve seat; said valve body and said valve seat cooperating with each other so as to open and close a fluid passage, means biasing said diaphragm and valve body in a valve closing direction, one of said two chambers being supplied a discharge pressure from said air pump whenever it is operating to act directly on said diaphragm against the bias of said biasing means and the other of said chambers being supplied a vacuum from the engine intake system, downstream of a throttle valve in a carburetor, to also act directly on said diaphragm against the bias of said biasing means.

2. The system of claim 1 including means connecting said air pump secondary air to the exhaust system for oxidizing harmful constituents of exhaust gases.

3. The system of claim 1 wherein the biasing means comprises a spring means to maintain the diaphragm in its neutral position, so that said valve body closes a fuel passage.

4. The system of claim 1, wherein: said fluid passage is for fuel.

5. The system of claim 1, wherein: said fluid passage is for air.

6. A system for controlling fuel supply in a LPG internal combustion engine, comprising:
   an air pump driven by an output shaft of said engine;
   a first pressure responsive valve including first and second chambers separated by a first diaphragm; a first valve body coupled to said first diaphragm; a first valve seat; said first valve body and said first valve seat cooperating with each other to open and close an air supply passage leading to a venturi portion in a carburetor; said second chamber being connected to said air pump; first means biasing said first diaphragm and said first valve body in a valve closing direction; said second chamber being supplied a discharge pressure from said air pump whenever it is operating to act directly on said first diaphragm against the bias of said first biasing means and said first chamber being supplied a vacuum from the engine intake system, downstream of a throttle valve in the carburetor, to also act directly on the first diaphragm against the bias of said first biasing means;

a second pressure responsive valve including third and fourth chambers separated by a second diaphragm; a second valve body coupled to said second diaphragm; a second valve seat; said second valve body and said second valve seat cooperating with each other to interrupt the fuel supply; said third chamber being connected to said first chamber in said first pressure responsive valve; said fourth chamber being connected to said air pump; second means biasing said second diaphragm and said second valve body in a valve closing direction; said fourth chamber being supplied a discharge pressure from said air pump whenever it is operating to act directly on said second diaphragm against the bias of said second biasing means and said third chamber being supplied a vacuum from the engine intake system, downstream of the throttle valve in the carburetor, to also act directly on the second diaphragm against the bias of said second biasing means; and a vacuum transmitting valve including an inlet and an outlet, said inlet being connected to said first chamber in said first pressure responsive valve and to said third chamber in said second pressure responsive valve; said outlet being connected to an intake system downstream of the throttle valve; and a vaporizer including a primary chamber connected to a fuel reservoir, a slow passage, a slow lock diaphragm, and a slow lock valve coupled to said slow lock diaphragm and controlling the communication between said primary chamber and said slow passage, and a lock diaphragm chamber defined by said slow lock diaphragm and supplied a vacuum from an intake system or an atmospheric pressure through a passage opened or closed by said second valve body and said second valve seat in said second pressure responsive valve.

7. A system for controlling fuel supply in a gasoline internal combustion engine, comprising:
an air pump driven by an output shaft of an engine;
a pressure responsive valve including first and second chambers separated by a diaphragm; a valve body coupled to said diaphragm; a valve seat; said valve body and said valve seat cooperating with each other to open and close a passage interconnecting said air pump and a control port in an engine intake system by way of an orifice; said second chamber being connected to said air pump; means biasing said diaphragm and said valve body in a valve closing direction; said second chamber being supplied a discharge pressure from said air pump whenever it is operating to act directly on said diaphragm against the bias of said biasing means and said first chamber being supplied a vacuum from the engine intake system, downstream of a throttle valve in a carburetor, to also act directly on said diaphragm against the bias of said biasing means;

a vacuum transmitting valve having an inlet and an outlet, said inlet being connected to the intake system downstream of the throttle valve, and said outlet being connected to said first chamber in said pressure responsive valve; and a slow port provided in said intake system in close vicinity to said control port, whereby fuel injection through said slow port may be controlled by said control port.

8. The system of claim 7 wherein a control port is provided in a venturi portion of the carburetor.

9. A system for controlling the supply of fuel in an internal combustion engine, said system comprising:
an air pump driven by the engine in direct proportion to the rotational speed thereof;
a fuel supply passage; and
a pressure responsive valve for controlling the flow of fuel through said passage, said valve comprising:
a housing;
a diaphragm separating the housing into first and second chambers;
a valve body connected to said diaphragm and movable therewith into a first position for blocking the flow of fuel through said fuel passage and a second position not blocking the flow of fuel through said fuel passage; and
means for biasing said diaphragm and said valve body into its first position; and
said first chamber being in uninterrupted fluid communication with the engine intake system downstream of a throttle valve in a carburetor so that vacuum transmitted from the intake system to said first chamber acts directly on said diaphragm against the bias of said biasing means; and said second chamber being in uninterrupted fluid communication with the output of said air pump so that the output of said air pump transmitted to said second chamber also acts directly on said diaphragm against the bias of said biasing means.

10. The system of claim 9, wherein:
said biasing means comprises a spring having a preselected force selected so that at both sea level and at higher elevations the valve will function substantially equally effectively.

11. The system of claim 10, wherein:
the preselected force is selected so that the diaphragm and valve body will move from the first to the second position when a pressure of approximately 605 mmHg acts on the diaphragm.

12. The system of claim 9, wherein:
said valve body directly blocks the flow of fuel through said fuel passage when in said first position.

* * * * *